March 15, 1966  J. W. POPOFF  3,240,892
SAFETY SWITCH FOR TRACTORS AND THE LIKE
Filed Feb. 15, 1963

INVENTOR
John W. Popoff
By
ATT'YS

United States Patent Office 3,240,892
Patented Mar. 15, 1966

3,240,892
SAFETY SWITCH FOR TRACTORS AND THE LIKE
John W. Popoff, Box 133, Blaine Lake,
Saskatchewan, Canada
Filed Feb. 15, 1963, Ser. No. 258,801
1 Claim. (Cl. 200—61.58)

My invention relates to new and useful improvements in safety switches adapted to cut off the engine of a tractor or other motor vehicle in the event that the operator is dislodged from the seat thereof.

Attempts have been made in the past to provide mercury type switches for this purpose but they are extremely sensitive in setting and expensive to manufacture. Furthermore it is quite possible for the operator to be dislodged from the tractor without the tractor tipping and with conventional switches the tractor merely proceeds without the operator with subsequent danger of damage occurring both to the tractor, to surrounding objects and of course to other people.

I have overcome this disadvantage by providing a safety switch which is incorporated into the seat of the vehicle and so arranged that the switch closes only when someone is sitting upon the seat and opens when the operator is displaced from the seat irrespective of whether the vehicle tips or not.

The principal object and essence of my invention is therefore to provide a device of the character herewithin described which is adapted to switch off the engine as soon as the driver leaves the seat of the vehicle.

A further object of my invention is to provide a device of the character herewithin described which is readily wired into the present ignition of the vehicle.

A yet further object of my invention is to provide a device of the character herewithin described which is simple in construction, economical in manufacture and otherwise well suited to the purpose for which it is designed.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which.

In the drawings like characters of reference indicate corresponding parts in the different figures.

Figure 1:
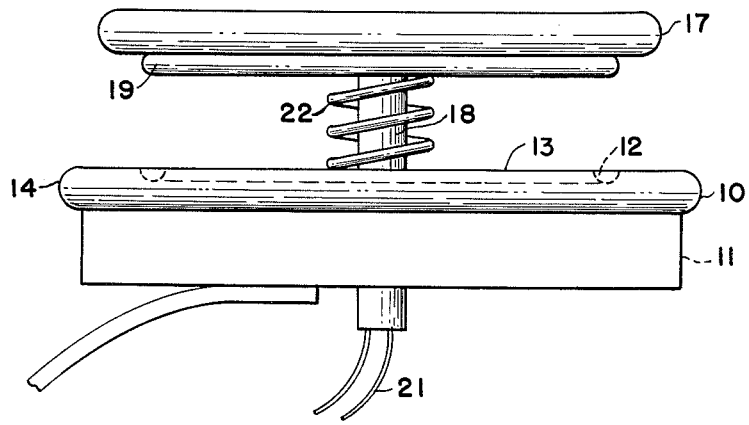
FIGURE 1 is a side elevation of my device.
Figure 2:
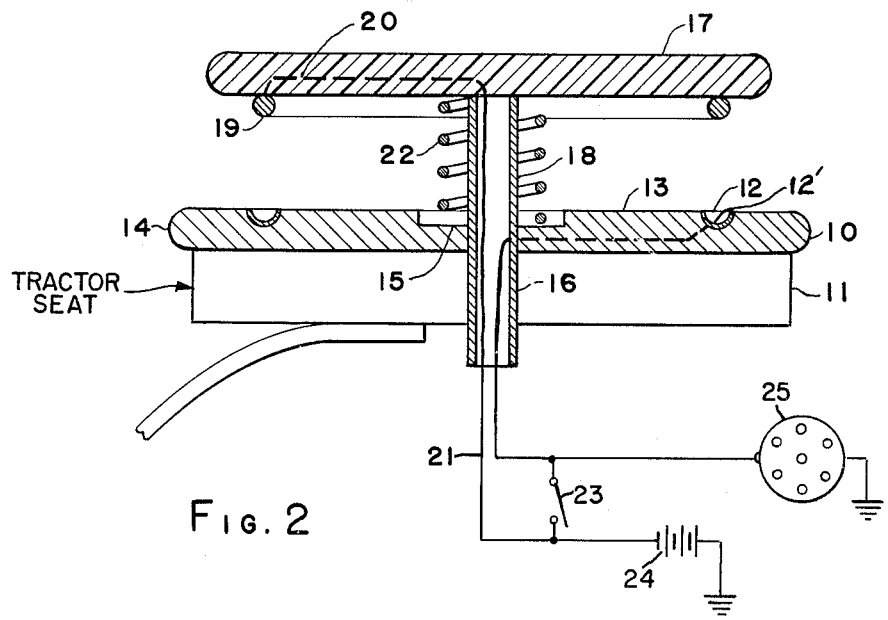
FIGURE 2 is a cross section view of FIGURE 1, also showing electrical connections.

Proceeding therefore to describe my invention in detail, it should first be pointed out that the device is adapted to be bolted to existing tractor or vehicle seats and in turn becomes the tractor or vehicle seat. Alternatively, it can be incorporated in a seat cushion if desired.

It consists of a circular base plate 10 preferably manufactured from plastic or hard rubber which is secured to the conventional tractor or vehicle seat 11 by means of bolts or the like (not illustrated).

An annular trough 12 is formed around the plate 10 in the upper surface 13 thereof and adjacent the perimeter 14 and this trough is lined with an electrical conducting material 12' such as copper or the like.

The base plate 10 is apertured centrally as at 15 and a similar aperture 16 is formed through the seat.

The upper plate 17 is also circular when viewed in plan and is provided with a centrally located hollow post 18 adapted to slide downwardly through the apertures 15 and 16. This plate 17 is also preferably made of plastic and an annular bead 19 is secured to the under surface 20 of this plate adjacent the perimeter thereof and adapted to be received in the aforementioned trough 12. This bead is also of electrical conducting material such as copper or the like.

Wires 21 extend both from the bead 19 and the trough lining 12' and pass downwardly through the post 18, the wires being connected in parallel with the ignition switch 23 to the battery 24 and distributor 25 of the tractor.

Finally a coil spring 22 surrounds the post 18 between the disc or plate 17 and the plate 10, normally maintaining the two portions apart.

In operation, the ignition switch 23 is left open and as soon as the operator sits upon the upper plate 17 thus forcing the head 19 into contact with the lining 12' in the trough 12 of lower plate against pressure of spring 22, the ignition circuit is completed independently of the switch 23.

However, as soon as the operator falls out of or leaves the seat or plate 17, the spring 22 forces the plate 17 away from the plate 10, thus breaking the circuit and causing the engine to stop.

It will be appreciated, that, if desired, the main ignition switch may be closed, under which circumstances of course, the safety switch described herewith is inoperative. This may be necessary if the operator desires to leave the tractor running while he is attending to other matters.

However, when operating it is desirable that the normal ignition switch be opened so that the ignition is then controlled entirely by contact of the elements 12' and 19, thus bringing into play the safety switch.

Since various modifications can be made in my invention as hereinabove described, and many apparently widely different embodiments of same made within the spirit and scope of the claim without departing from such spirit and scope, it is intended that all matter contained in the accompanying specification shall be interpreted as illustrative only and not in a limiting sense.

What I claim as my invention is:

The combination of a tractor having an operator's seat and an ignition system including a conventional ignition switch, and a safety device for rendering said ignition system operative when said ignition switch is open but also only when said operator's seat is occupied, said safety device comprising a seat attachment including a lower member of insulating material secured to said seat, a depressible plate disposed above said lower member and constituting a seat substitute, resilient means biasing said plate away from said lower member, and first and second electrical contact means provided in opposing relation on said lower member and on said plate respectively, said first and second electrical contact means being connected in parallel with said ignition switch to said ignition system and being engageable with each other to energize said system independently of said switch when said plate is depressed by weight of an operator sitting thereon, said lower member being plate-shaped and provided with a central aperture and with an annular trough concentric with said aperture, said first electrical contact means comprising an upwardly facing open channel of conductive material lining said trough, a central post depending from said depressible plate and extending slidably through said aperture in said lower member, said resilient means comprising a compression spring surrounding said post and reacting between said lower member and said depressible plate, said second electrical contact means comprising an annulus of conductive material provided at the underside of said plate concentrically with said post, said annulus being receivable in said channel when said plate is depressed against the resiliency of said spring.

References Cited by the Examiner

UNITED STATES PATENTS

| | | | |
|---|---|---|---|
| 2,249,645 | 7/1941 | Applegarth | 200—85 |
| 2,606,983 | 8/1952 | Rypinski | 200—166 |
| 2,612,232 | 9/1952 | Morrison | 200—85 |
| 2,674,669 | 4/1954 | Leedam | 200—85 |
| 3,005,187 | 10/1961 | Passa | 200—85 |
| 3,086,093 | 4/1963 | Barker | 200—85 |

BERNARD A. GILHEANY, *Primary Examiner.*

ROBERT K. SCHAEFER, *Examiner.*